(12) United States Patent
Kim et al.

(10) Patent No.: US 7,924,931 B2
(45) Date of Patent: Apr. 12, 2011

(54) APPARATUS AND METHOD FOR RECEIVING SIGNALS IN MULTI-CARRIER MULTIPLE ACCESS SYSTEMS

(75) Inventors: Hak Seong Kim, Seoul (KR); Bong Hoe Kim, Gyeonggi (KR); Dong Wook Roh, Seoul (KR); Joon Kui Ahn, Seoul (KR); Dong Youn Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 466 days.

(21) Appl. No.: 11/913,539

(22) PCT Filed: May 2, 2006

(86) PCT No.: PCT/KR2006/001648
§ 371 (c)(1),
(2), (4) Date: May 27, 2008

(87) PCT Pub. No.: WO2006/118412
PCT Pub. Date: Nov. 9, 2006

(65) Prior Publication Data
US 2008/0247474 A1 Oct. 9, 2008

(30) Foreign Application Priority Data
May 2, 2005 (KR) ........................ 10-2005-0036862

(51) Int. Cl.
*H04L 27/28* (2006.01)
(52) U.S. Cl. ........................................ 375/260
(58) Field of Classification Search .......... 375/130–131, 375/260, 340, 342, 346, 147–148, 150; 370/208, 370/210, 335, 342
See application file for complete search history.

(56) References Cited

U.S. PATENT DOCUMENTS
6,389,295 B1  5/2002  Ramesh
(Continued)

FOREIGN PATENT DOCUMENTS
CN  1278130  12/2000
(Continued)

OTHER PUBLICATIONS

Johansson, A.-L. et al.: "Multistage interference cancellation with decision direct channel estimation in multirate DS/CDMA on a mobile radio channel." 1996.

*Primary Examiner* — Khanh C Tran
(74) *Attorney, Agent, or Firm* — Lee, Hong, Degerman, Kang & Waimey

(57) ABSTRACT

A method for receiving signals in a multi-carrier multiple access system is disclosed. The method comprises receiving signals from at least one base station wherein each signal has a base station identifier, processing the signals to identify each base station by using the base station identifier, performing a channel estimation using the processed signals, combining the processed signals using an information obtained from the channel estimation and decoding the combined signals. Also, an apparatus for receiving signals in a multi-carrier multiple access system comprises a serial-to-parallel converter for converting a serial signal including a base station identifier from at least one base station to parallel signals, a Fast Fourier transformer for transforming the parallel signals, a parallel-to-serial converter for converting the parallel signals to a serial signal, a despreading processor for despreading frequency domain signals using the base station identifier from at least one base station, a channel estimator for compensating a channel variation between the at least one base station and a mobile station, a signal combiner for combining signals from base stations and a decoder for decoding the combined signal.

10 Claims, 3 Drawing Sheets

U.S. PATENT DOCUMENTS

| | | | | |
|---|---|---|---|---|
| 6,967,989 B2* | 11/2005 | Gorday et al. | | 375/147 |
| 7,436,758 B2* | 10/2008 | Suh et al. | | 370/203 |
| 7,471,932 B2* | 12/2008 | Wu et al. | | 455/91 |
| 7,499,728 B2* | 3/2009 | Chae et al. | | 455/562.1 |
| 7,515,559 B2* | 4/2009 | Koo et al. | | 370/328 |
| 2005/0094550 A1* | 5/2005 | Huh et al. | | 370/203 |
| 2005/0107036 A1* | 5/2005 | Song et al. | | 455/23 |

FOREIGN PATENT DOCUMENTS

| | | |
|---|---|---|
| EP | 1376896 | 1/1994 |
| WO | WO 01/58105 | 8/2001 |

\* cited by examiner

APPARATUS AND METHOD FOR RECEIVING SIGNALS IN MULTI-CARRIER MULTIPLE ACCESS SYSTEMS

FIELD OF THE INVENTION

The present invention relates to an apparatus and method for receiving signals in multi-carrier multiple access systems, and more particularly, to an apparatus and method for estimating wireless channels between a mobile station and base stations during handover (or handoff) and combining signals using the estimations.

DISCUSSION OF THE RELATED ART

In multi-carrier multiple access cellular mobile communications systems, a mobile station in downlink handover gets a macro diversity gain. In other words, the mobile station in handover receives the same data from two or more nearby base stations in the form of a combined signal through different communication channels.

There are two methods of getting the macro diversity gain, namely, Equal Gain Combining (EGC) and Maximal Ratio Combining (MRC). The EGC method does not compensate amplitude distortions, but only compensates phase distortions. Since the amplitude gain is always 1, the channel estimation is performed by using only phase distortion compensation. However, the MRC method has better performance than the EGC method in most channel environments because the MRC method performs a channel estimation by compensating both amplitude and phase distortions. In general, if maintained synchronization between cells transmitting the same data during handover, it is possible to effectively decode receiving signals using the EGC method without additional signal processing. In that case, formats of the receiving signals such as transmission type, pattern, location, etc. should be the same to get the macro diversity gain. Even though the MRC method is a preferable method to increase the combined gain, current multi-carrier multiple access systems have a problem for increasing the macroscopic diversity gain using the MRC method because current multi-carrier multiple access systems are difficult to perform channel estimations by each communication link between each base station and the mobile station when the same frequency band(s) or sub-carrier(s) in neighboring cells as those of a current serving cell are assigned at the same time interval.

Therefore, it is highly desired to develop a technology which provides base station differentiating codes to compensate channel distortions and to maximize macro diversity gain.

SUMMARY OF THE INVENTION

Accordingly, the present invention is directed to an apparatus and method form receiving signals in multi-carrier multiple access systems that substantially obviate one or more problems due to limitations and disadvantages of the related art.

An object of the present invention is to provide an apparatus and method for a mobile station during handover to effectively combine and decode signals.

Another object of the present invention is to provide base station differentiating codes to compensate channel distortions and to maximize macro diversity gain.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for receiving signals in a multi-carrier multiple access system comprising receiving signals from at least one base station wherein each signal has a base station identifier, processing the signals to identify each base station by using the base station identifier, performing a channel estimation using the processed signals, combining the processed signals using an information obtained from the channel estimation and decoding the combined signals.

In another aspect of the present invention, an apparatus for receiving signals in a multi-carrier multiple access system comprises a serial-to-parallel converter for converting a serial signal including a base station identifier from at least one base station to parallel signals, a Fast Fourier transformer for transforming the parallel signals, a parallel-to-serial converter for converting the parallel signals to a serial signal, a despreading processor for despreading frequency domain signals using the base station identifier from at least one base station, a channel estimator for compensating a channel variation between the at least one base station and a mobile station, a signal combiner for combining signals from base stations and a decoder for decoding the combined signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Wherever possible, the same reference numbers will be used throughout the drawings to refer to the same or like parts.

An explanation is given, as an example, for the Orthogonal Frequency Division Multiple Access (OFDMA) which is one of multi-carrier multiple access systems. The OFDMA is a system in which a plurality of users performs multiple accesses using OFDM.

Figure 1:
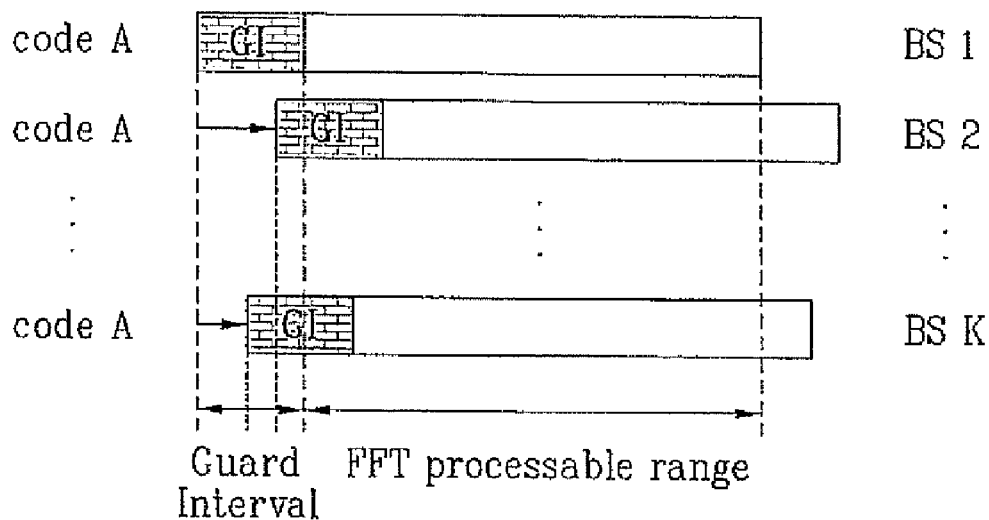
FIG. 1 illustrates a method of receiving data in a mobile station during handover.

FIG. 1 shows a method of receiving data in a mobile station during handover.

The mobile station during handover receives data from K number of base stations in the same frame format. That is, the data received by the mobile station have the same frame format since the data received in the mixed form are not distinguishable by each base station.

Moreover, because channel estimations can not be done by each base station, the received data are decoded using the EGC method. To obtain the macro diversity gain using the EGC method, all base stations should be synchronized, thereby the time delays from each base station are within the guard interval. Otherwise, the length of the guard interval should be extended. The guard interval can be generated by repeating a part of the data to prevent an aliasing effect.

As shown in FIG. 1, however, it is likely that some, if not all, of base stations are not synchronized. Also, since additional elements are required to maintain the synchronization, it is desired to have a technology which could get the macro diversity gain when not all base station is synchronized.

Figure 2:
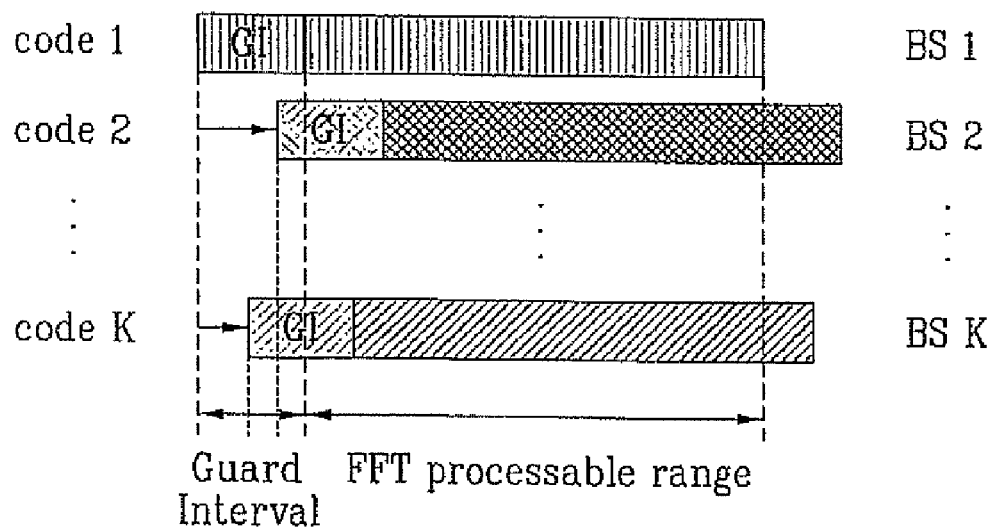
FIG. 2 illustrates another method of receiving data in a mobile station during handover.

FIG. 2 shows another method of receiving data in a mobile station during handover. In this figure, each data from each base station has a code to distinguish base stations. In other words, each data has an orthogonal code or pseudo-orthogonal code to distinguish each base station during soft handover in multi-carrier multiple access wireless mobile communications systems. The orthogonal code includes Pseudo Noise (PN) code, Orthogonal Variable Spreading Factor (OVSF) code and Walsh code. The pseudo-orthogonal code includes Gold code. Especially, the OVSF code has better performance when base stations are synchronized. Also, the codes have a fixed Spreading Factor (SF) which can be easily implemented though a variable SF is also possible to use.

Figure 3:
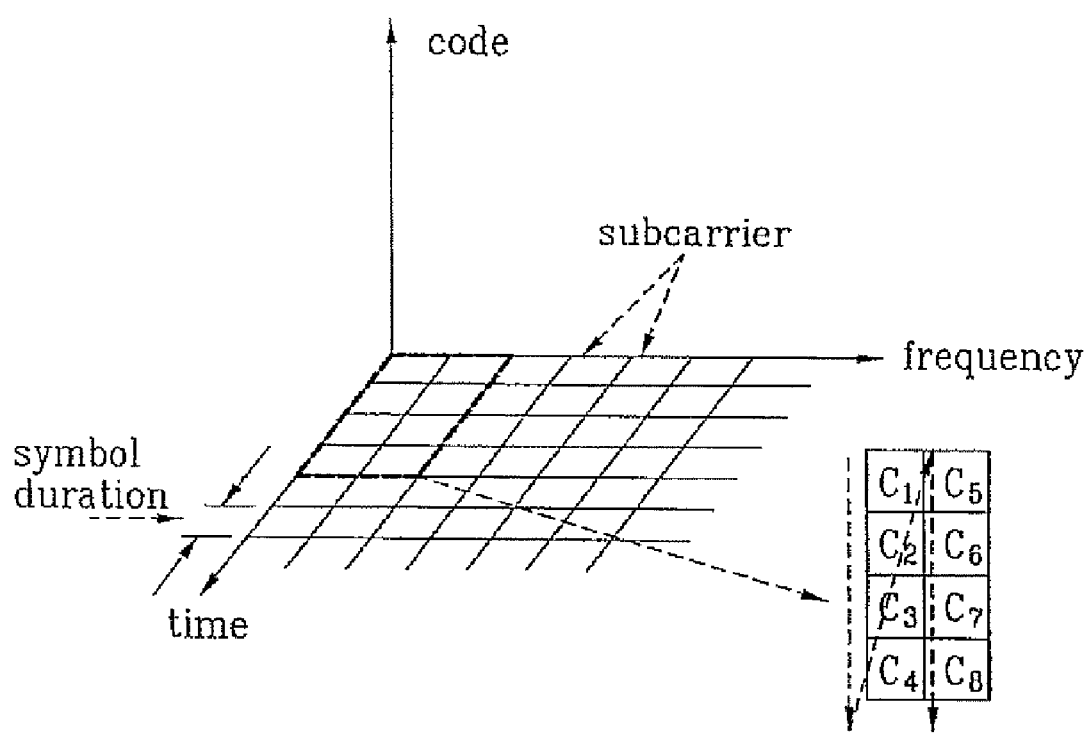
FIG. 3 illustrates a code generation method to distinguish base stations during handover.

FIG. 3 shows a code generation method to distinguish base stations during handover. After determining a code and a SF to distinguish base stations, tie transmitted symbol is repeated by the SF until matched with the length of spreading code. A frequency-time spreading code is assigned to each base station. In the frequency-time spreading codes, the unit of frequency domain is a subcarrier and the unit of time domain is a symbol duration.

The mobile station during handover receives data from K number of base stations in the same frame format. That is, the data received by the mobile station have the same frame format since the data received in the mixed form are not distinguishable by each base station.

FIG. 3 shows when the SF is 8. In this case, the symbol is repeated 4 times in the time domain and 2 times in frequency domain. The frequency-time spreading code (C={C1, . . . ,C8}) is multiplied before sending to the mobile station.

The frequency-time SF can be expressed as:

$$SF = SF_{time} * SF_{freq} \quad \text{(Equation 1)}$$

where SF is total spreading factor, $SF_{time}$ is a spreading factor in time domain and $SF_{freq}$ is a spreading factor in frequency domain. When $SF_{time}=1$, data is spread only over the frequency domain whereas when $SF_{freq}=1$, data is spread only over the time domain. In general, if $SF_{time}>1$ and $SF_{freq}>1$, data is spread over both the time and frequency domains. Therefore, the SF can be a two dimensional factor.

FIG. 3 is an example of Equation 1 when $SF_{time}=2$ and $SF_{freq}=4$. To generate a frequency-time code of SF=8, a various combination of $SF_{time}$ and $SF_{freq}$ can be achieved. When the SF is set, $SF_{time}$ and $SF_{freq}$ can be varied according to the channel condition.

If the data received at the mobile station can be distinguished by each base station, the received data does not need to have the same frame format/structure, transmission type, pattern, location, etc. In other words, though all the base stations do not have the same frame format, the mobile station can separate the data by each base station.

Moreover, the mobile station performs channel estimations according to the received data and decodes the data using the receiver employing the MRC method. That is, the mobile station performs the channel estimations using a pilot signal from each base station, compensates channel distortions by each channel link from each base station to the mobile station and combines the received data using the MRC method. Therefore, higher macro diversity gain is achieved when compared to non-combining methods such as the EGC method.

According to the present invention, though it is not necessary to exactly synchronize the data from base stations, it is recommended that a maximum delay among data from base stations to the mobile station is within a guard interval. In other words, if the maximum delay is larger than the guard interval, it is highly likely that OFDM symbols after performing FFT are severely destroyed.

Figure 4:
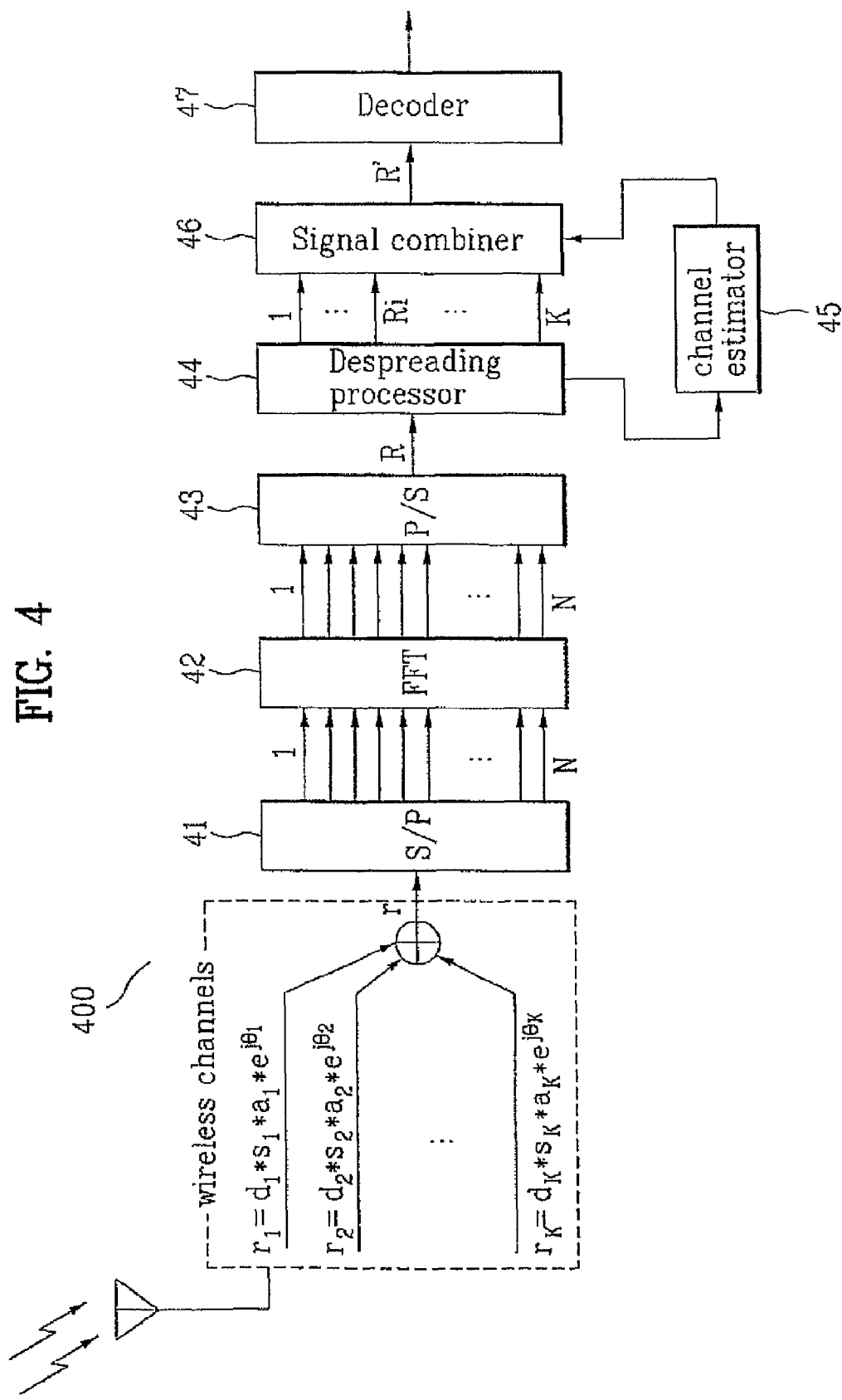
FIG. 4 illustrates a block diagram showing a receiver according to the present invention.

FIG. 4 shows a receiver (400) during a handover which combines data from K base stations and decodes the data. The mobile station during handover receives data from K base stations.

The data from each base station can be expressed as:

$$r_i = d_i * s_i * a_i * e^{j\theta_i} \quad \text{(Equation 2)}$$

where $r_i$ is the received signal from ith base station, $d_i$ is the transmitted data of ith base station, $s_i$ is a base station differentiating code assigned to the base station and the channel coefficient $h_i = a_{iu} * e^{j\theta_i}$ has the ith channel gain (or amplitude) $a_i$ and the ith channel phase shift $\theta_i$ between ith base station and the mobile station. The length of $s_i$ is determined by the SF and the code $s_i$ is designed to simultaneously spread in the time domain and frequency domain according to the SF. Normally, 1-dimensional spreading such as the time-domain spreading or the frequency-domain spreading is preferred. However, 2-dimensional spreading such as the time-domain and frequency-domain spreading is also possible. The main purpose of $s_i$ is to differentiate base stations.

The received signal r with some delays can be expressed as:

$$r = \sum_{i=1}^{K} r_i \quad \text{(Equation 3)}$$

The S/P converter (41) converts the received signal r to parallel signals every N sample, thereafter the parallel signals are Fourier transformed to signals on a frequency axis by FFT (42). Moreover, the FFT converted signals are again converted to serial signals by the P/S converter (43).

The serial signal from the P/S converter (43) can be expressed as:

$$R = \sum_{i=1}^{K} H_i S_i D_i \quad \text{(Equation 4)}$$

where $D_i$, $S_i$ and $H_i$ are Fourier transforms of $d_i$, $s_i$ and $h_i$, respectively.

The despreading processor (44) identifies a signal from each base station using the base station identifiers. After the despreading processor (44), the signal can be expressed as;

$$R_i = H_i(S_i * S_i)D_i = H_i D_i, \because (S_i * S_i) = 1 \quad \text{(Equation 5)}$$

where i (=1,...,K) is the index of base stations. The above equation is simplified for illustration purpose only and usually more complex.

The channel estimator (45) performs channel estimations by using the differentiated signals. The channel estimator can be any type including a Minimum Mean Square Error (MMSE) estimator, a Constrained Least Squares (CLS) estimator or a Maximum Likelihood (ML) estimator. The channel estimator (45) calculates the conjugates of the channel coefficients, that is, $H_i^*$ which can be obtained for all K base stations or a specific base station. The channel estimator (45) also provides all the necessary values (e.g., amplitude, phase, etc.) to perform the MRC method.

The signal combiner (46) performs the MRC method using the estimated channel information, thereby compensating amplitude distortion in addition to the phase distortion, and combines signals from base stations to maximize Signal to Noise Interference Ratio (SNIR). The signal combiner (46) also can perform the MRC method to maximize (or minimize) other ratios or parameters. In this way, soft combining can be achieved. Moreover, a person having ordinary skill in the art also can implement a hard combining of selecting only the best channel or several channels using the present invention.

The combined signal after the signal combiner (46) can be expressed as;

$$R' = \sum_{i=1}^{K} H_i^* H_i D_i = \sum_{i=1}^{K} D_i \quad \text{(Equation 6)}$$

Finally, the decoder (47) decodes the combined signal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for receiving signals in a multi-carrier multiple access system, the method comprising:
   receiving signals from at least one base station, wherein each signal includes a base station identifier;
   processing the signals to identify each of the at least one base station by using the base station identifier;
   performing a channel estimation using the processed signals;
   combining the processed signals using information obtained from the channel estimation; and
   decoding the combined signals,
   wherein a maximum delay among signals from the at least one base station for transmitting a signal is within a guard interval,
   wherein the base station identifier comprises a frequency-time spreading code having a total spreading factor $SF=SF_{time}*SF_{freq}$, and
   wherein $SF_{time}$ is a spreading factor in time domain and $SF_{freq}$ is a spreading factor in frequency domain.

2. The method of claim 1, wherein the step of combining includes a Maximal Ratio Combining (MRC) method.

3. The method of claim 1, wherein the base station identifier includes one of Pseudo Noise (PN) code, Orthogonal Variable Spreading Factor (OVSF) code, Walsh code and Gold code.

4. The method of claim 1, wherein the total spreading factor comprises one of a fixed spreading factor and a variable spreading factor.

5. The method of claim 1, wherein the multi-carrier multiple access system includes an Orthogonal Frequency Division Multiple Access (OFDMA) system.

6. The method of claim 1, wherein the step of processing includes despreading, descrambling or deorthogonalizing the signals.

7. An apparatus for receiving signals in a multi-carrier multiple access system comprising:
   a serial-to-parallel converter for converting a serial signal including a base station identifier from at least one base station to parallel signals;
   a Fast Fourier transformer for transforming the parallel signals;
   a parallel-to-serial converter for converting the parallel signals to a serial signal;
   a despreading processor for despreading frequency domain signals using the base station identifier from at least one base station;
   a channel estimator for compensating a channel variation between the at least one base station and a mobile station;
   a signal combiner for combining signals; and
   a decoder for decoding the combined signal.

8. The apparatus of claim 7, wherein the signal combiner combines signals using Maximal Ratio Combining (MRC) method.

9. The apparatus of claim 7, wherein the multi-carrier multiple access system includes an Orthogonal Frequency Division Multiple Access (OFDMA).

10. The apparatus of claim 7, wherein the channel estimator includes one of a minimum mean squared (MMSE) estimator, a Constrained Least Squares estimator or a Maximum Likelihood (ML) estimator.

* * * * *